United States Patent
Guo et al.

(10) Patent No.: US 7,752,613 B2
(45) Date of Patent: Jul. 6, 2010

(54) DISAMBIGUATION IN DYNAMIC BINARY TRANSLATION

(75) Inventors: Bolei Guo, Elmhurst, NY (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 11/634,399

(22) Filed: Dec. 5, 2006

(65) Prior Publication Data

US 2008/0134159 A1 Jun. 5, 2008

(51) Int. Cl.
G06F 9/45 (2006.01)
(52) U.S. Cl. .................. 717/153; 717/151; 717/154; 717/155; 717/156; 717/158; 717/159; 717/136
(58) Field of Classification Search ......... 717/153–156, 717/158, 161
See application file for complete search history.

(56) References Cited

U.S. PATENT DOCUMENTS

| | | | | |
|---|---|---|---|---|
| 6,467,075 | B1 * | 10/2002 | Sato et al. | 716/18 |
| 6,631,514 | B1 * | 10/2003 | Le | 717/137 |
| 6,832,370 | B1 * | 12/2004 | Srinivasan et al. | 717/161 |
| 2002/0066090 | A1 * | 5/2002 | Babaian et al. | 717/156 |
| 2003/0005420 | A1 * | 1/2003 | Ghosh et al. | 717/150 |
| 2003/0237077 | A1 * | 12/2003 | Ghiya et al. | 717/151 |
| 2005/0149915 | A1 * | 7/2005 | Wu et al. | 717/137 |

OTHER PUBLICATIONS

Mock et al., "Dynamic Points-To Sets: A Comparison with Static Analyses and Potential Applications . . . ," UW CSE/Microsoft, Mar. 2001.*
Jagannathan et al., "Effective Flow Analysis for Avoiding Run-Time Checks," ACM, 1995.*
Tallam et al., "Extended whole program paths," ACM, 2005.*
Landi et al., "Safe Approximate Algorithm for Interprocedural Pointer Aliasing," ACM/SIGPLAN, 2003.*
Lin, "A Compiler Framework for Speculative Optimizations," ACM, Sep. 2004.*
Huang et al., "Speculative Disambiguation: A Compilation Technique for Dynamic Memory Disambiguation," IEEE, 1994.*
Salami et al., "Dynamic Memory Interval Test Vs. Interprocedural pointer analysis in Multimedia Applications," ACM, Jun. 2006.*
Salami et al., "Cost Effective Memory Disambiguation for Multimedia Codes," ACM, 2002.*
Su et al., "A Study of Pointer Aliasing for Software Pipelining using Run-time Disambiguation," ACM, 1994.*

(Continued)

*Primary Examiner*—Insun Kang
(74) *Attorney, Agent, or Firm*—Blakely, Sokoloff, Taylor & Zafman LLP (57) ABSTRACT

A method and apparatus for disambiguating in a dynamic binary translator is described. The method comprises selecting a code segment for load-store memory disambiguation based at least in part on a measure of likelihood of frequency of execution of the code segment; heuristically identifying one or more ambiguous memory dependencies in the code segment for disambiguation by runtime checks; based at least in part on inspecting instructions in the code segment, and using a pointer analysis of the code segment to identify all other ambiguous memory dependencies that can be removed by the runtime checks.

24 Claims, 3 Drawing Sheets

OTHER PUBLICATIONS

Bernstein et al., "Dynamic Memory Disambiguation for Array References," ACM, 1994.*
Onder et al., "Dynamic Memory Disambiguation in the Presence of Out-of-order Store Issuing," IEEE, Nov. 1999.*
Fernandez et al., "Speculative Alias Analysis for Executable Code," IEEE, Sep. 2002.*
Ebcioglu et al., "Dynamic Binary Translation and Optimization," IEEE, 2001.*
Guo et al., "Selective Runtime Memory Disambiguation in a Dynamic Binary Ttranslator," Pubzone, Apr. 5, 2006.*
Nicolau, "Run-Time Disambiguation: Coping with Statically Unpredictable Dependencies," IEEE, May 1989.*

* cited by examiner

DISAMBIGUATION IN DYNAMIC BINARY TRANSLATION

BACKGROUND

Dynamic binary translation is known in the art as a technique that may be used to rewrite or create a version of a binary program originally executable on one processor-based platform that is, after translation, usable on a different processor-based platform. For example, a binary translator may convert a program intended for an Apple® PowerPC processor based platform into a program executable on an Apple platform based on an Intel® Core Duo® Processor.

A code optimization technique termed load-store disambiguation is known in the art. In general, optimization may re-order loads and stores from and to memory in an original program to produce a program with potentially improved performance. However, moving a load earlier in the execution order, than a store, or "above" a store, may potentially be an incorrect transformation of a program during optimization if the memory references in the load and store respectively are aliases of each other, that is, if they refer to the same actual memory location, and hence the program instruction that performs the load depends on the instruction that performs the store. Thus in general, analysis of a program that is being optimized is required to determine whether two memory references of interest in the optimization process are aliases. In some instances, for a pair of memory references where one depends on the other, the state of aliasing with reference to the two references is termed ambiguous if it is difficult to determine by static analysis of the program whether the two memory references alias.

DETAILED DESCRIPTION

Figure 1:
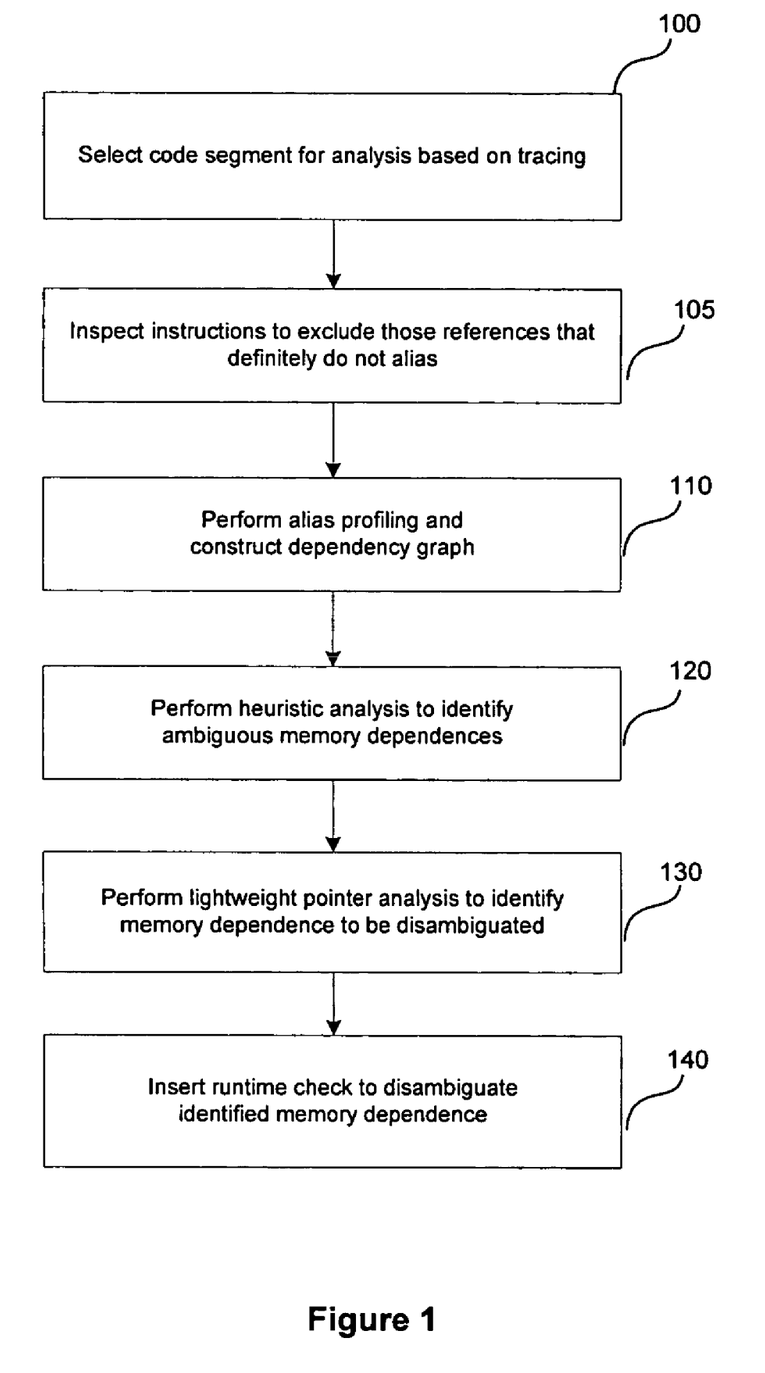
FIG. 1 depicts processing in one embodiment at a high level.

In one embodiment, a dynamic binary translator (DBT) may first translate binary or machine code for one platform to another in multiple phases, as shown in FIG. 1. As mentioned earlier, the DBT may translate a program capable of execution on a first processor based platform into a program capable of execution in a second processor based platform. The first and second platforms may respectively be an x86 based platform, an Intel Itanium® based platform, or a PowerPC based platform among many others. In a first phase, the original binary code is translated without optimization, and instrumentation code may then be inserted into the translation produced by this first phase. Results obtained from the instrumentation may then be used to determine hot code, at 100 in FIG. 1, or frequently executed code based on results obtained during executions of the program produced by the first phase and thus to select a code segment for analysis based on tracing. In general, in DBTs, the identified frequently executed code may be in the form of single-entry, multiple exit traces. As is known in the art, results obtained by instrumentation are not always identical to those encountered in actual practice, and thus estimates of frequency of execution are approximate.

For the purposes of optimization, and specifically for the purposes of dynamic disambiguation in the optimizing phase of a DBT in this embodiment, generally only code in these traces identified by the instrumented phased described above is selected for memory dependence disambiguation Instruction inspection may then be performed to exclude memory reference pairs that definitely do not alias in this embodiment, as shown in block 105. Next, as shown at block 110, a dependence graph of the traces is constructed and each edge is labeled with a latency, which in general is an expected time for execution to take place along that edge.

Further, at 110, an alias profiling step may be taken wherein instrumentation is inserted to identify the effective addresses accessed by memory locations that cannot be definitively determined to be non-aliases by instruction inspection. This allows the optimization process to rule out definite aliases. However, in general there will remain pairs of references in the code whose aliasing relation cannot be determined either by instruction inspection or by instrumentation. We will call these remaining dependencies "false dependencies".

For those memory references pairs in the code segment where it cannot be determined whether the references alias, a heuristic program 120 may then be executed in this embodiment to identify pairs of memory references that should be disambiguated by runtime checks. The goal of the heuristic algorithm is to narrow the number of runtime checks inserted per trace to a few that will have the largest impact on code performance.

Following the heuristic algorithm a lightweight pointer analysis 130 takes place to identify all memory references that can be disambiguated by the runtime checks. This is followed by runtime check insertion, 140, to disambiguate the identified dependencies. The heuristic algorithm, pointer analysis, and runtime checks are discussed further below.

Figure 2:
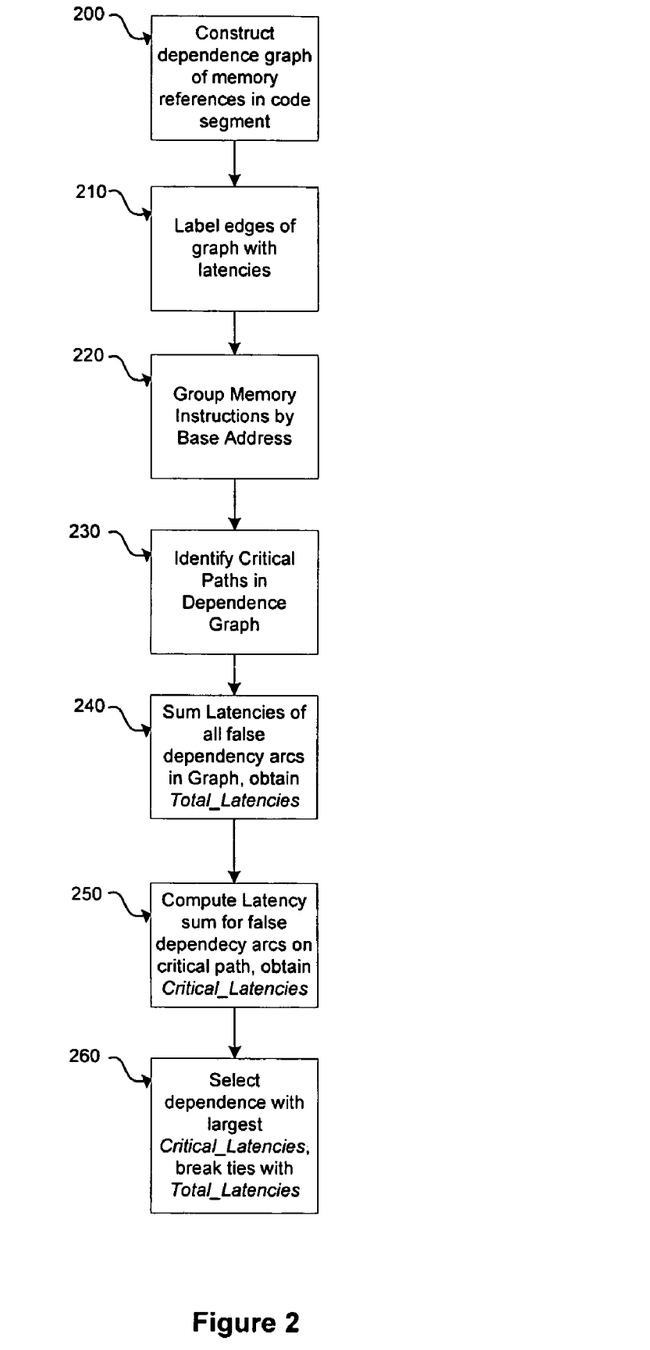
FIG. 2 depicts a processor based system in one embodiment of the invention.

The processing involved in performing the heuristic algorithm are depicted in FIG. 2. In preparation for heuristic processing, the dependence graph mentioned above is constructed, 200, and the edges of the graph labeled with latencies, 210. The heuristic algorithm begins in this embodiment by grouping memory instructions according to their base addresses, 220. In this embodiment, a base address is that portion of the memory operand of an instruction that is derived from a register, to which an offset may be applied in order to obtain the final address accessed. These registers may include, for example, the frame pointer; and the stack pointer, among others. Memory instructions whose addresses are constants are gathered in the same group.

In different embodiments, the addresses of memory references in code in general may be computed differently based on the architecture of the underlying platform for which the code is intended. For example, more than one register may be involved in computing a base address, or all base addresses may be directly provided to instructions as operands in an immediate format or in an in-memory format.

Next, the heuristic algorithm traverses the dependence graph that was previously computed, to identify critical paths, 230 and to sum latencies of all memory dependence arcs that are false dependencies, 240 according to the alias profiling step discussed above, where the source and destination instruction operand addresses fall into distinct groups based on the base addresses of the operand addresses. This value may be termed Total_Latencies. Next, a similar value is computed, but in this case, the latencies are only computed for memory dependencies on critical paths. This value may be termed Critical_Latencies, 250.

The algorithm then selects for runtime disambiguation the pair of base addresses that has the largest non-zero Critical- _Latencies. Ties are broken using Total_Latencies, 260. These addresses are termed critical base addresses.

In this embodiment, the pointer analysis algorithm may then be used to determine all memory dependencies that can be safely removed by each runtime check. The analysis achieves this by computing symbolically the set of possible values for each register and each memory location touched within a trace. In this embodiment, the traces are single-entry, which means the size of each symbolic value set is always 1 due to the absence of merge points. The analysis identifies two types of dependencies for each critical base address pair returned by the heuristic algorithm: directly covered dependencies, or memory references which are guaranteed to evaluate to the same base address as one of the critical base addresses; and indirectly covered memory dependencies which, while not accessing memory locations pointed to by a critical base address, may still be disambiguated by removal of false memory dependencies as a result of more accurate pointer information.

A pseudocode algorithm to analyze memory instructions in one embodiment is presented below in Table 1. The algorithm maintains three data structures, Reg_Values, Mem_Values, and Inst_Addrs. Reg_Values is a table that maps each register to a symbolic expression describing the current field held in that register. Mem_Values is a table that maps each symbolic address to a symbolic expression, in the form of (reg_name, def_site), where def_site is the id of the instruction that writes the value into the register reg_name, describing the current value stored at that address. For some symbolic addresses, it might map them to a NULL value if the pointer analysis fails to infer any information about the value stored at that address. Inst_Addrs is a table that maps each memory instruction to a symbolic expression describing the address it accesses As indicated in the pseudocode, the symbolic address of each memory instruction is compared in the loop starting at line 2 in the pseudocode with those of the memory references in all memory instructions that come before it in the trace. The two addresses being compared are determined to be non-aliasing if the base address parts of the two symbolic addresses are the same and the offsets are different. The addresses are must-alias addresses if both the base addresses and the offsets are the same. If the memory instruction is a store, the analysis removes the contents of all aliasing symbolic addresses recorded in the table Mem_Values and changes them to NULL at line 7. This is because the store might write to any of these aliasing locations, destroying the values held there. If the memory instruction is a load as at line 8, the analysis looks up the symbolic address at Mem_Values, line 10. If it is mapped to a non-NULL value, line 11, this means that there is a previous must-alias instruction for which the analysis has recorded the value in memory after the instruction and this information has not been destroyed by any subsequent aliasing store. In this case, the destination register of the load can assume the value recorded in Mem_Values line 12. Otherwise, the analysis can say nothing about the value loaded into the destination register, either because the value has been destroyed by aliasing stores or because the value is a live-in through memory. In this case, the analysis simply records in Mem_Values that the content of the memory location is whatever value that is currently in the destination register, line 15.

TABLE 1

```
//Instruction t is a memory reference
1  addr_t := Inst_Addrs(t)
2  for each memory instruction s before t
3      addr_s := Inst_Adds(s)
```

TABLE 1-continued

```
4      if (may_alias(addr_s, addr_t))
5          record dependence s->t
6          if (is_store(t))
7              Mem_Values(addr_s) := NULL
8  if (is_load(t))
9      r := dest_reg(t)
10     content_t := Mem_Values(addr_t)
11     if (content_t != NULL)
12         Reg_Values(r) := content_t
13     else
14         Reg_Values(r) := (r, t)
15         Mem_Values(addr_t) := Reg_Values(r)
```

As is known in the art, many variations on the above-depicted pseudocode are possible. For example, the names and implementations of data structures may vary, specific means of recording states of memory locations may use different constants, such as a Boolean value or a zero instead of NULL, among many other variations that are possible.

Once memory reference dependencies that can be disambiguated are determined, runtime checks can be inserted. A trace scheduling algorithm such as the one described in J. A. Fisher, *Trace Scheduling: A Technique for Global Microcode Compaction IEEE Transactions on Computers*, vol. C-30, pp. 478-490, July 1981, may be used to insert proper compensation code at split points.

To insert a runtime check for disambiguation, proper test conditions must be generated to handle all the different offsets that have not been considered until this point. Only memory references that are directly covered by the runtime checks need be considered. Each memory check is characterized by an address address and a reference size size which together effectively specify a range of memory addresses, specifically the range of addresses from address to address+size−1, written as is known in the art as [address, address+size). Given two addresses and sizes, a runtime check should then check for disjointedness of the two ranges of addresses specified by the two addresses and sizes.

Let range1=[a, b) and range2=[c, d), If the two ranges are disjointed, either range1 is below range2, which is captured by the condition b<=c, or range1 is above range2, which is captured by the condition d<=a. For each pair of critical base addresses, say, (basea, baseb), the algorithm separates the memory dependencies directly covered by each critical address into two groups to differentiate these two situations. Profiling may provide good guidance on deciding which group a memory dependence should go to. The actual addresses recorded in the initial alias profiling phase may be used for this purpose. Let a ! b denote a dependence directly covered by (basea, baseb) and let instruction Ia, which refers to address a, have a base address denoted by basea and instruction Ib refer to address b whose base address is baseb. If the actual address range of a is below the actual address range of b according to the profile, then a ! b is placed in group I, otherwise it is placed in group II. Two checks may then be generated, one for each group. Within each group, a check needs to be able to accommodate all the different offsets from a single base address. To do this, the concept of an extended range is introduced, which contains all ranges relevant to a base address within either group. Suppose that there are n dependencies in group I (or group II) and that the n instructions with basea as base address are described by the (symbolic address, size) pairs (basea+offset_1, size_1), . . . , and (basea+offset_n, size_n). Then the extended range corresponding to basea in this group is [basea+min(offset_1, . . . , offset_n), basea+max(offset_1+size_1, . . . , offset_n+size_n)), where min and max are a minimum and a maximum function, respectively. The extended range for baseb can be computed in the same fashion.

Figure 3:
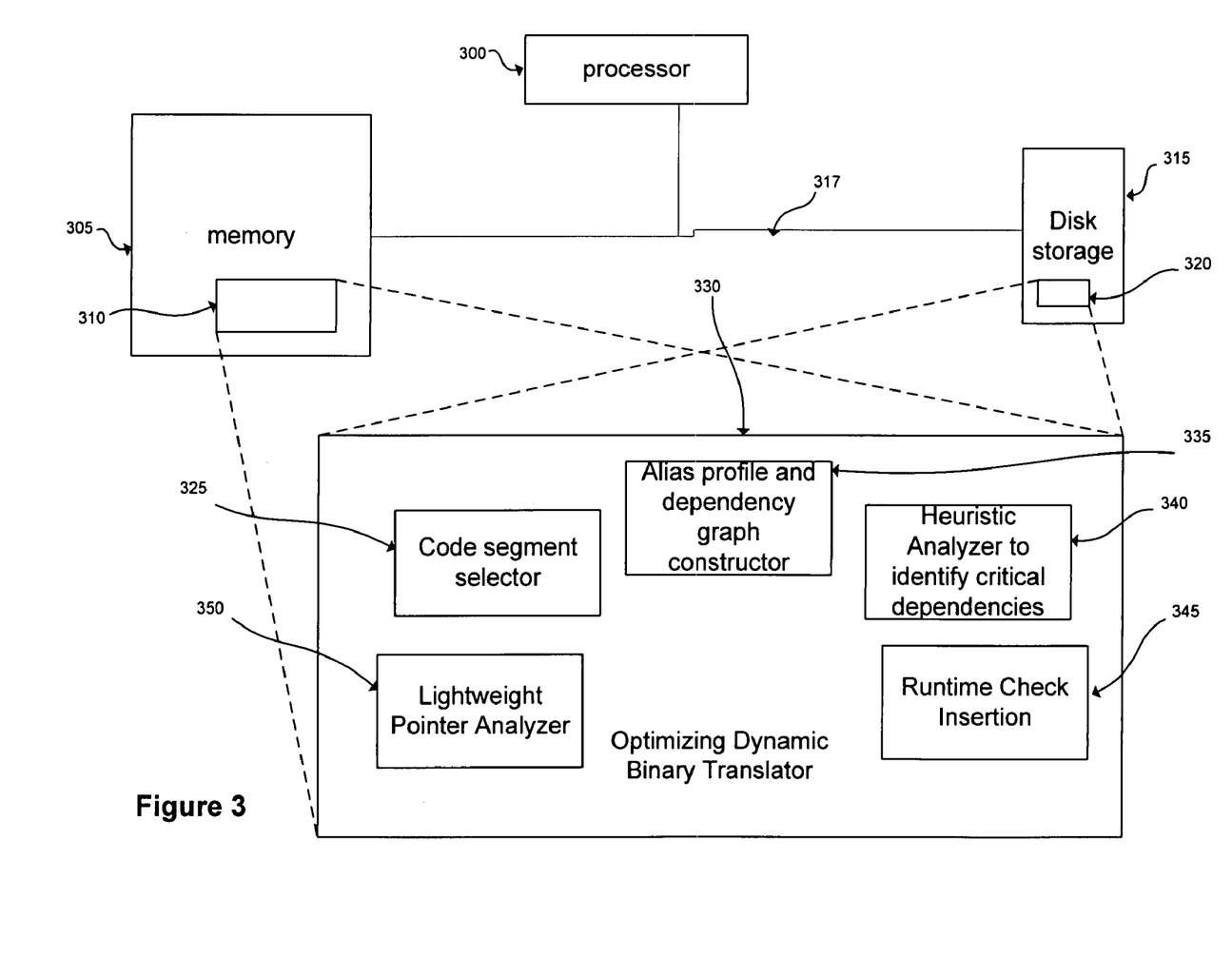
FIG. 3 depicts a processor based system in one embodiment

Furthermore, in general, an embodiment may be implemented at least in part by a processor based system such as that depicted in FIG. 3. Such a system is a processor based system including a processor, processor core, or processors 300, a memory 305 to store data and programs executable by the processor, and a storage unit such as a disk system 315 all interconnected by a bus system 317. A program embodying the various computations described may be stored on the disk system at 320 and loaded into memory at 310 via the bus system and executed by the processor on data which may also be stored on the disk system and optionally in memory. Thus in one embodiment, an optimizing binary translator 330 further comprising modules such as a code segment selector, 325, an alias profiling module which also constructs a dependency graph as described above, 335, a heuristic analysis module to identify critical dependencies, 340, a lightweight pointer analysis module 350 and a runtime check insertion component 345 may be stored in the storage at 320 and be loadable into the memory at 310.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. A memory, or a magnetic or optical storage such as a disc may be the machine readable medium. Any of these mediums may "caffy" or "indicate" the design or software information.

Embodiments may be provided as a program product that may include a machine-readable medium having stored thereon data which when accessed by a machine may cause the machine to perform a process according to the claimed subject matter. The machine-readable medium may include, but is not limited to, a storage medium such as floppy diskettes optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A method comprising:

translating a first binary code executable on a first processor to a second binary code executable on a second processor;

inserting instrumentation code to the second binary code for selecting a code segment of the second binary code for load-store memory disambiguation based at least in part on a measure of likelihood of frequency of execution of the code segment;

determining prior to runtime checks non-aliasing memory references for exclusion associated with memory references of load and store instructions in the selected code segment;

heuristically identifying, in response to the determining, one or more ambiguous memory dependencies associated with the memory references of the load and the store instructions in the selected code segment for disambiguation by the runtime checks;

performing a pointer analysis of the selected code segment, in response to the heuristically identifying, to identify all other ambiguous memory dependencies removable by the runtime checks; and inserting the runtime checks to the selected code segment to disambiguate identified ambiguous memory dependencies from the pointer analysis and to disambiguate heuristically identified memory dependencies.

2. The method of claim 1 further comprising generating a dependence graph of traces of the selected code segment, the dependence graph having labels of expected execution times for each trace.

3. The method of claim 1, wherein selecting the code segment further comprises selecting the code segment based on tracing the instrumented code.

4. The method of claim 1, wherein heuristically identifying ambiguous memory dependencies associated with the memory references of the load and the store instructions in the code segment further comprises:
identifying non-aliases and must-aliases of the code segment.

5. The method of claim 1, wherein heuristically identifying the one or more ambiguous memory dependencies further comprises:
identifying memory dependencies based at least in part on grouping memory references in the code segment into a plurality of groups based at least in part on the base addresses of the memory references.

6. The method of claim 2, wherein heuristically identifying the one or more memory dependencies further comprises:
analyzing the dependence graph of the code segment;
in critical paths associated only with the memory dependencies in the dependence graph, the remaining paths of the dependence graph being non-critical paths;
summing the expected execution times of traces identified as the critical paths;
summing the expected execution times of traces of the non-critical paths;
selecting the one or more memory dependencies based on the summed expected execution times of critical and non-critical paths.

7. The method of claim 4, wherein identifying non-aliases and must-aliases of the code segment further comprises instrumenting the code segment to determine an actual memory location accessed by a memory reference.

8. The method of claim 1, wherein the runtime checks comprise symbolically computing a value of a register and a value of a memory location referenced by the code segment.

9. A system comprising
a processor;
a memory coupled with the processor;
a storage coupled with the processor; and
a dynamic binary translator storable in the storage, loadable into the memory; and executable by the processor, the dynamic binary translator when executed by the processor causes the processor to perform a method, the method comprising:
translating a first binary code executable on a first processor to a second binary code executable on a second processor;
inserting instrumentation code to the second binary code for selecting a code segment of the second binary code for load-store memory disambiguation based at least in part on a measure of likelihood of frequency of execution of the code segment;
determining prior to runtime checks non-aliasing memory references for exclusion associated with memory references of load and store instructions in the selected code segment;
heuristically identifying, in response to the determining, one or more ambiguous memory dependencies associated with the memory references of the load and the store instructions in the selected code segment for disambiguation by the runtime checks;
performing a pointer analysis of the selected code segment, in response to the heuristically identifying, to identify all other ambiguous memory dependencies removable by the runtime checks; and
inserting the runtime checks to the selected code segment to disambiguate identified ambiguous memory dependencies from the pointer analysis and to disambiguate heuristically identified memory dependencies.

10. The system of claim 9, wherein the dynamic binary translator when executed by the processor causes the processor to perform a further method comprising generating a dependence graph of traces of the selected code segment, the dependence graph having labels of expected execution times for each trace.

11. The system of claim 9, wherein selecting the code segment further comprises to select the code segment based on tracing the instrumented code.

12. The system of claim 9, wherein heuristically identifying ambiguous memory dependencies associated with the memory references of the load and the store instructions in the code segment further comprises identifying non-aliases and must-aliases of the code segment.

13. The system of claim 9, wherein heuristically identifying the one or more ambiguous memory dependencies further comprises identifying memory dependencies based at least in part on grouping memory references in the code segment into a plurality of groups based at least in part on the base addresses of the memory references.

14. The system of claim 10, wherein heuristically identifying the one or more memory dependencies further comprises:
analyzing the dependence graph of the code segment;
indentifying critical paths associated only with the memory dependencies in the dependence graph, the remaining paths of the dependence graph being non-critical paths;
summing the expected execution times of traces identified as the critical paths;
summing the expected execution times of traces of the non-critical paths;
selecting the one or more memory dependencies based on the summed expected execution times of critical and non-critical paths.

15. The system of claim 12, wherein identifying non-aliases and must-aliases of the code segment further comprises to instrument the code segment to determine an actual memory location accessed by a memory reference.

16. The system of claim 12, wherein the runtime checks further comprise symbolically computing a value of a register and a value of a memory location referenced by the code segment.

17. A machine readable storage medium having stored thereon data that when accessed by a machine causes the machine to perform a method, the method comprising:
translating a first binary code executable on a first processor to a second binary code executable on a second processor;
inserting instrumentation code to the second binary code for selecting a code segment of the second binary code for load-store memory disambiguation based at least in part on a measure of likelihood of frequency of execution of the code segment;

determining prior to runtime checks non-aliasing memory references for exclusion associated with memory references of load and store instructions in the selected code segment;

heuristically identifying, in response to the determining, one or more ambiguous memory dependencies associated with the memory references of the load and the store instructions in the selected code segment for disambiguation by the runtime checks;

performing a pointer analysis of the selected code segment, in response to the heuristically identifying, to identify all other ambiguous memory dependencies removable by the runtime checks; and inserting the runtime checks to the selected code segment to disambiguate identified ambiguous memory dependencies from the pointer analysis and to disambiguate heuristically identified memory dependencies.

18. The machine readable medium of claim 17 having stored thereon further data that when accessed by the machine causes the machine to perform a further method comprising:

generating a dependence graph of traces of the selected code segment, the dependence graph having labels of expected execution times for each trace.

19. The machine readable medium of claim 17, wherein selecting the code segment further comprises selecting the code segment based on tracing the instrumented code.

20. The machine readable medium of claim 17, wherein heuristically identifying ambiguous memory dependencies associated with the memory references of the load and the store instructions in the code segment further comprises identifying non-aliases and must-aliases of the code segment.

21. The machine readable medium of claim 17, wherein heuristically identifying the one or more ambiguous memory dependencies further comprises identifying memory dependencies based at least in part on grouping memory references in the code segment into a plurality of groups based at least in part on the base addresses of the memory references.

22. The machine readable medium of claim 18, wherein heuristically identifying the one or more memory dependencies further comprises:

analyzing the dependence graph of the code segment;

identifying critical paths associated only with the memory dependencies in the dependence graph, the remaining paths of the dependence graph being non-critical paths;

summing the expected execution times of traces identified as the critical paths;

summing the expected execution times of traces of the non-critical paths;

selecting the one or more memory dependencies based on the summed expected execution times of critical and non-critical paths.

23. The machine readable medium of claim 20, wherein identifying non-aliases and must-aliases of the code segment further comprises instrumenting the code segment to determine an actual memory location accessed by a memory reference.

24. The machine readable medium of claim 20, wherein the runtime checks further comprise symbolically computing a value of a register and a value of a memory location referenced by the code segment.

* * * * *

UNITED STATES PATENT AND TRADEMARK OFFICE
CERTIFICATE OF CORRECTION

PATENT NO. : 7,752,613 B2  
APPLICATION NO. : 11/634399  
DATED : July 6, 2010  
INVENTOR(S) : Guo et al.

Page 1 of 1

It is certified that error appears in the above-identified patent and that said Letters Patent is hereby corrected as shown below:

In column 7, at line 28 delete, "in" and insert -- identifying --.

Signed and Sealed this  
Tenth Day of May, 2011

David J. Kappos  
*Director of the United States Patent and Trademark Office*